United States Patent
Radatti et al.

(10) Patent No.: US 7,093,135 B1
(45) Date of Patent: Aug. 15, 2006

(54) SOFTWARE VIRUS DETECTION METHODS AND APPARATUS

(75) Inventors: Peter V. Radatti, Conshohocken, PA (US); Joseph W. Wells, Pahrump, NV (US)

(73) Assignee: CyberSoft, Inc., Conshohocken, PA (US)

( * ) Notice: Subject to any disclaimer, the term of this patent is extended or adjusted under 35 U.S.C. 154(b) by 0 days.

(21) Appl. No.: 09/568,716

(22) Filed: May 11, 2000

(51) Int. Cl.
*H04L 9/00* (2006.01)

(52) U.S. Cl. ............... 713/188; 713/175; 713/176; 726/22; 726/24

(58) Field of Classification Search ............ 713/201, 713/176, 175, 200, 188; 380/255; 707/202, 707/1; 726/22, 24
See application file for complete search history.

(56) References Cited

U.S. PATENT DOCUMENTS

| | | | |
|---|---|---|---|
| 5,825,877 A * | 10/1998 | Dan et al. ............... | 705/54 |
| 5,956,481 A * | 9/1999 | Walsh et al. ............ | 713/200 |
| 5,978,917 A * | 11/1999 | Chi ......................... | 713/201 |
| 6,094,731 A * | 7/2000 | Waldin et al. ........... | 714/38 |
| 6,154,844 A * | 11/2000 | Touboul et al. ......... | 713/201 |
| 6,157,721 A * | 12/2000 | Shear et al. ............. | 380/255 |
| 6,327,656 B1 * | 12/2001 | Zabetian ................. | 713/176 |
| 6,577,920 B1 * | 6/2003 | Hypponen et al. ...... | 700/200 |
| 6,611,925 B1 * | 8/2003 | Spear ...................... | 714/38 |
| 2001/0020272 A1 * | 9/2001 | Le Pennec et al. ..... | 713/200 |
| 2002/0073055 A1 * | 6/2002 | Chess et al. ............. | 707/1 |
| 2002/0091940 A1 * | 7/2002 | Welborn et al. ......... | 713/201 |

OTHER PUBLICATIONS

DRAFT; Work Plan for Protection of Authorized Merck Macros; (Original Meck Request for Solution); dated Feb. 12, 1997; 2 pages.
The Word Operator (WDOPR); (C) 1992-1995 Microsoft Corporation; 3 pages.
Calling Routines in DLLs; dated Aug. 26, 1997; 5 pagesx.
The wdCommandDispatch Function; (C) 1992-1997 Microsoft Corporation; 4 pages.
What You Need to Know; (C) 1992-1995 Microsoft Corporation; 9 pages.
Overview of Add-ins and WLLs; (C) 1992-1995 Microsoft Corporation; 2 pages.
AddAddIn, AddAddIn0; (C) 1992-1995 Microsoft Corporation; 2 pages.
AddInState, AddInState0; (C) 1992-1995 Microsoft Corporation; 1 page.
Language Differences Across Versions of Word; (C) 1992-1995 Microsoft Corporation; 8 page.
Calling Word from a WLL; (C) 1992-1995 Microsoft Corporation; 1 page.

(Continued)

*Primary Examiner*—Ayaz Sheikh
*Assistant Examiner*—Taghi T. Arani
(74) *Attorney, Agent, or Firm*—John F. A. Earley, III; Frank J. Bonini, Jr.; Harding, Earley, Follmer & Frailey

(57) ABSTRACT

The present invention is a system and method for identifying and securing code, as well as providing virus detection and code authentication. This detection and authentication occurs through modules or components which utilize certification identifiers to authenticate and validate code. Preferred embodiments include macro detection.

6 Claims, 4 Drawing Sheets

OTHER PUBLICATIONS

Word Limits; (C) 1992-1995 Microsoft Corporation; 1 page.
Word API Functions; (C) 1992-1995 Microsoft Corporation; 2 pages.
Techniques for Successful Calling; (C) 1992-1995 Microsoft Corporation; 2 pages.
Using the CAPILIB Functions ; (C) 1992-1995 Microsoft Corporation; 8 pages.
DLLs and WordBasic Overview; 9 Pages.
Introduction; 22 pages.
Cross-Platform Macros; 7 pages.
Calling a WLL Function; 5 pages.

* cited by examiner

SOFTWARE VIRUS DETECTION METHODS AND APPARATUS

The present invention relates to software virus detection. More particularly, the present invention relates to the detection of software viruses in macros and other programs.

BACKGROUND OF THE INVENTION

Society's use of computing technology has been both helped and hindered by two trends.

The first trend is the use of connected computers, via networks and the Internet. The use of connected computers has tremendously enhanced the ability to share information. On the other hand, the use of connected computers has also tremendously enhanced the ability to spread harmful and malicious programs, such as viruses. The infamous Melissa code in early 1999 made use of the Internet to multiply and infect many computers via email. The dramatic increase in communication via email means this malicious threat will increase.

The second trend simultaneously helping and hindering the use of computers is the near universal use of Microsoft's Office suite of products. Having information in a common format, such as Microsoft's Word, Excel, etc. helps share information. On the other hand, having information in a common format means that harmful and malicious programs are spread easier and impact more program users.

Computer viruses usually spread through infecting other programs. Programs take many forms and can be written in many languages. Microsoft's Office suite of applications presently use a language known as Visual Basic for Applications or VBA. Using VBA, the programmer can change virtually all the functions of any particular Office program (or other programs such as Visio that also implement VBA.) These changes can be through an actual program or through a subroutine known as a macro, which for all intents and purposes operates like a program.

The power of VBA can be harnessed by authorized and unauthorized programmers. Essentially VBA provides a portal for entry into a VBA compliant program. Viruses, worms and other malicious programs and code can attack VBA compliant programs through the VBA portal. Moreover, Word or other VBA programs can, through infection by a certain type of malicious code, create a VBA virus: the malicious code may itself not be a virus but creates a virus. The attack by malicious code is not limited to VBA compliant programs as the malicious code can also manipulate a VBA program to affect other, non VBA programs on the user's machine as well.

A common attack by malicious code is through infection of the default global template in Word, which is a file called normal.dot. Once normal.dot is infected, each subsequent document created in Word will be infected. If copies of the infected documents are then made and provided to new users, the infection will travel with the document and infect the normal.dot template on the new user's machines. In turn, each document then created with the new user's infected normal.dot will be infected. Thus, the document itself provides a transmission medium for viruses and once infected, a document may infect every subsequent copy or revision. An early macro virus, W97M/Wazzu.A, operated in this fashion by first infecting normal.dot and spreading to each subsequent document.

Of course, malicious code is not limited to VBA compliant programs. Malicious code may take many forms and infect many levels of the system's operation.

The primary method of detecting and eliminating any viruses is through use of an antivirus program. Antivirus programs generally use two detection methods. The first detection method checks program code against a database of known virus code. This first detection method relies on automatic scanning, such as by scheduling, and/or manual scanning of the user's programs. The second detection method checks program code by heuristics, or approximate rules. Using a heuristics approach, it is not necessary to update a database, however, it is necessary to understand in advance the common approaches or attacks a virus may make on a computer system in order to construct the approximate rules.

New viruses are constantly being created. In order for a database antivirus program to be constantly effective, therefore, the antivirus database must be constantly updated to include new viruses. If the antivirus program relies on heuristics, those rules must be constantly verified to insure the new viruses are liable to be detected.

A second method of preventing virus attacks, occasionally used in conjunction with the antivirus program method, is to disable, usually temporarily, the ability of a VBA compliant program to use macros. This disabling does not require constant updates as does an antivirus program. Of course, this disabling also prevents the user from fully utilizing the program's design.

A third method of preventing virus attacks is to password protect normal.dot, the primary template for Word, by way of a program such as Microsoft's WordProt. If a password is lost, or another user desires to use the machine without knowing the password, the password scheme fails.

The implementation difficulties of the methods set forth above are magnified when network and enterprise-wide implementation of VBA compliant programs is attempted. Possible email and other computer to computer communication in such an environment, with the attendant viral infection possibilities can be overwhelming.

Accordingly, it is an object of the present invention to simply and efficiently detect malicious code.

It is a further object to simply and efficiently detect viruses in VBA compliant programs.

It is a further object to detect viruses in VBA compliant programs automatically or virtually automatically so that little or no user interaction is required.

It is a further object to detect malicious code in a network or enterprise environment.

SUMMARY OF THE INVENTION

The present invention is a system and method for identifying and securing code, as well as providing virus detection and code authentication. In preferred embodiments, this detection and authentication occurs through interacting modules or components, and a certification validation effectively links the interacting modules or components.

In the preferred embodiment, a validation component reviews and scans code for virus infections. If the code passes the validation component scanning, the validation component will then associate the code with a validation key. A database of keys are kept with the validation component. The validation component is usually located on a central or administrative machine.

A workstation component, located on a user's machine, scans code and rejects or filters out that code that is not authorized—that lacks a certification identifier—by referencing the database. In preferred embodiments, the database of authorized code is frequently updated. Additionally, the database of authorized code may be disseminated throughout a system on a regular basis so a local database may exist as well as the central database. These embodiments are especially useful in a portable computer situation.

The preferred embodiments may also have portable validation components. A certification identifier or identifiers may be assigned to the code of a certain entity, such as, for example, an enterprise's supplier. When the code is run by the enterprise, the validation component will be referenced against the database of authorized code, which will include the supplier's code. The code will then possibly be permitted to run, depending upon the outcome of the reference.

In the especially preferred embodiments, the certification identifier will include a hash code, which will help ensure that the macro that is checked is unchanged from the code that is authorized. Thus, the workstation component will both check for a validation key for the code, and then check the hash code to insure the macro is authorized. This will be a two level security check.

Multiple configurations are possible for the workstation component. For example, one workstation, such as a system administrator's workstation, may have the ability to open documents with unauthorized code, yet an administrative assistant's workstation may have the ability to only open documents with authorized macros. Moreover, in other preferred embodiments, the validation process may encrypt the code in order to insure another level of protection. A workstation component may then be configured to allow only encrypted code to be opened.

Other embodiments may enable dynamic use. For example a document with code that has not previously been authenticated may be intercepted by a workstation component, a copy made of the document and retained by the component, and the original sent to the validation component, and instantly scanned, thus enabling "on the fly" authentication.

Embodiments may be program specific, such as an embodiment for VBA compliant programs, WordBasic, Excel formulas and the like.

DETAILED DESCRIPTION OF THE PREFERRED EMBODIMENTS

Figure 1:
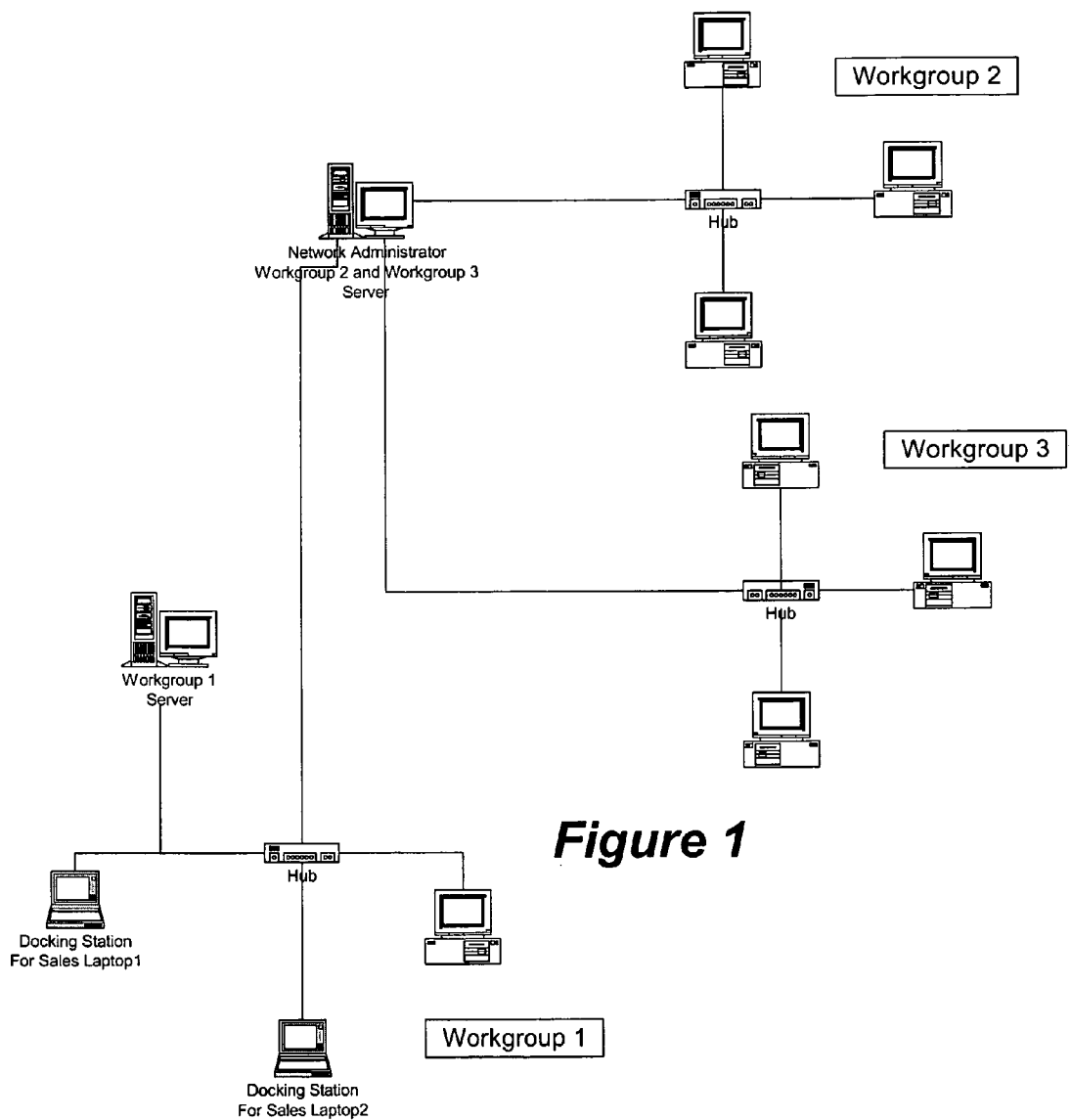
FIG. 1 shows a typical enterprise-wide network configuration.

FIG. 1 shows a typical enterprise-wide network configuration. Three workgroups are shown. Workgroup 1 has its own server. That Workgroup 1 server is networked and connected, in a manner known in the art, through a hub to two docking stations with installed laptops as well as a stand-alone PC. Workgroups 2 and 3 share a server which is also the network administrator machine. These workgroups are also networked and connected in a manner known in the art through hubs and consist entirely of stand-alone PCs. Each machine is running Windows 98 and Microsoft Office.

Figure 2:
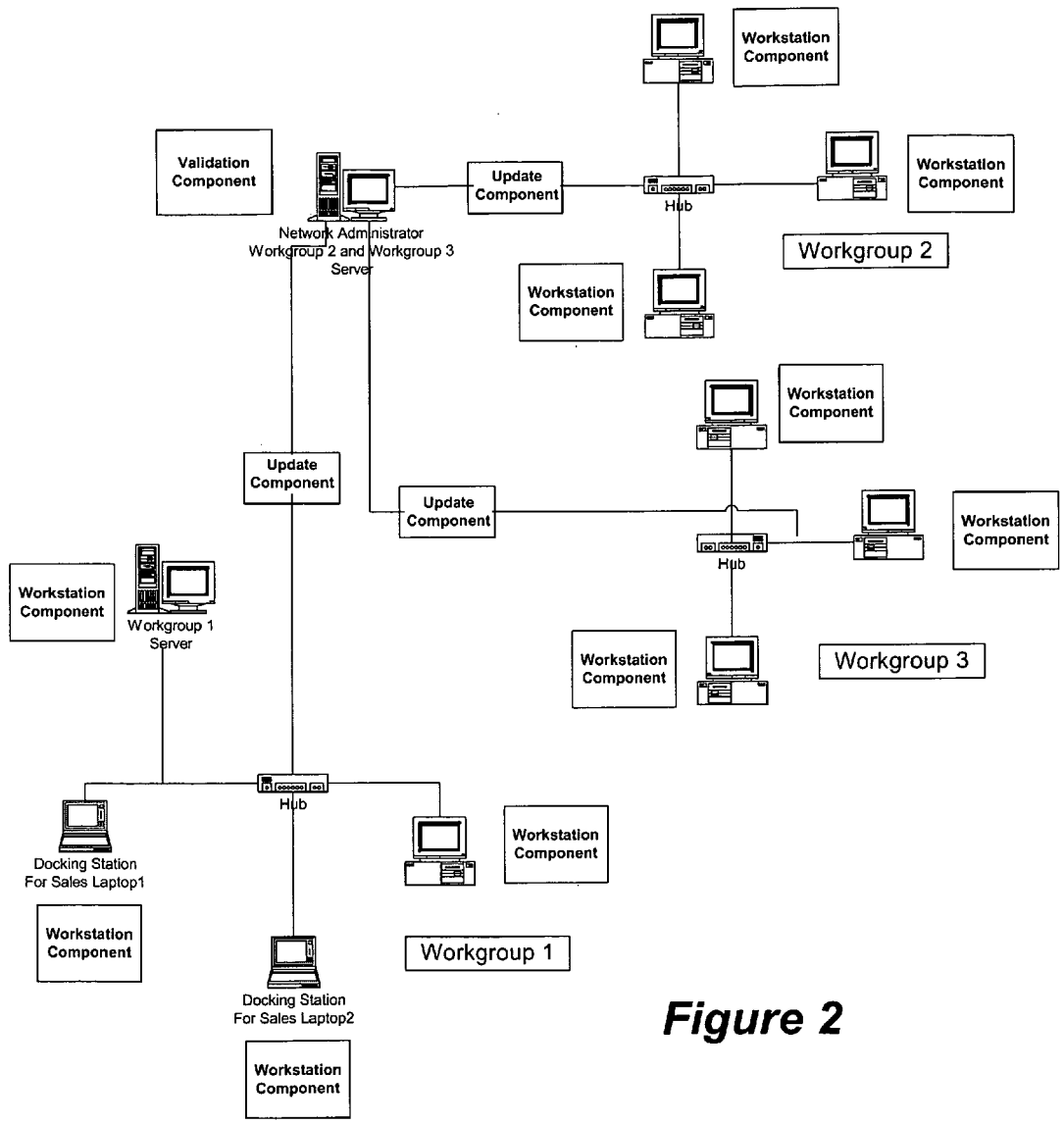
FIG. 2 shows a preferred embodiment installed on the configuration of FIG. 1.

Turning to FIG. 2, installed components of a preferred embodiment of the present invention are seen. The network administrator has a validation component installed. Each of the other machines has a workstation component installed. Update components are sent from the validation component to each workstation component. The components are explained in further detail below.

Figure 3:
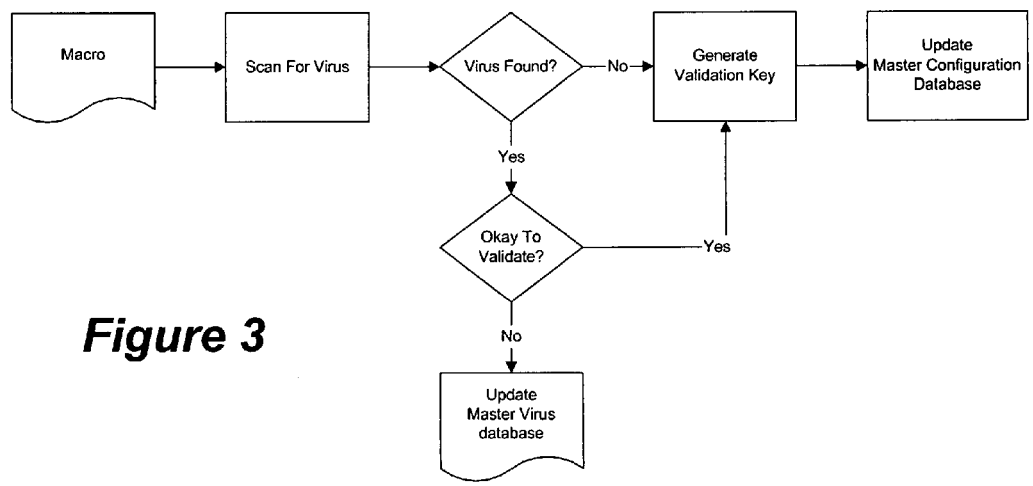
FIG. 3 is a step of the method of the preferred embodiment of FIG. 2.

Turning now to FIG. 3, a method of operation of a validation component of a preferred embodiment is seen. This example begins with a macro provided to the system. In this and other embodiments, the operation is not limited to authentication of only macros. Any code can be authenticated using the embodiments.

The macro in the example of FIG. 3 is new to the system and the macro has not previously been authenticated. This macro is scanned for virus infection by the validation component. The virus scan can be through any method known in the art such as for example a database scan, a heuristics scan, or a combination of the two. For example CyberSoft's VFIND™ has the ability to scan macros effectively through both a database and heuristics scan.

The process of this embodiment will then provide a number of options depending upon the result of the scan. If a virus is not found, a certification identifier in the form of a validation key is generated for that particular macro. If a virus or virus like code is found, the component permits either of two options to be chosen. The first option, usually chosen when a virus is found, is to prohibit execution of the code. In some embodiments this prohibition would include adding the code or other certification identifier, to a Master Virus database and/or Forbidden Code database. The second option, usually chosen when virus like code is found, is to authenticate the code, which here involves generating a certification identifier in the form of a validation key, which is subsequently inserted into the Master Configuration database with subsequent dissemination.

In some embodiments, a Master Virus database and/or Forbidden Code database might first be referenced before reviewing the code.

Assuming a certification identifier in the form of a validation key is generated, that validation key is then inserted in a Master Configuration database. That Master Configuration database is preferably maintained in one central location, for example, in this embodiment with the validation component. In some embodiments, in order to keep more precise records, the validation key database entry may include information on when and where the code was validated. The Master Configuration database may be encoded, encrypted and/or password protected in some embodiments by methods known in the art. The Master Configuration database will be desirably updated on a regular basis. Additionally, in the preferred embodiments an update component will be sent to a local database which is a copy of the Master Configuration database and which will be used in certain local workstation configurations as is described further below. Thus the Master Configuration database will be comprised of preexisting certification identifiers in some preferred embodiments.

It may also be desired, in some embodiments, to include a database of virus code and/or unavailable or "forbidden" code. Thus, once the code has been scanned, and determine to be viral or unavailable, a certification identifier in the form of an identification key is attached. That identification key would then be inserted in a Master Virus database and/or Forbidden Code database. These databases could also be part of the Master Configuration database. In any event, in the preferred embodiments, these databases would be built from preexisting certification identifiers. Moreover, in some embodiments, the use of a Forbidden Code database could provide a method of authorization by permitting the identification of code that is not permitted to be run on a machine. That is, the Forbidden Code database might desirably provide a mirror image of the Master Configuration database. For example, a Forbidden Code database might be used to allow the running of any code except that code that has certification identifiers listed in the Forbidden Code database.

In some embodiments, the certification identifier uses encoding, as is known in the art, and is attached to each individual piece of code, rather than being placed in a database. Here too, in some embodiments, in order to keep more precise records, the encoded certification identifier may include information on when and where the code was validated.

A preferred embodiment creates a certification identifier that includes a hash code a summary of the actual code that has been authenticated. The hash code can be created through any of a number of methods known in the art. Thus, when the certification identifier is checked, this hash code or hash value of the code provides the ability to ascertain that the code has not been modified from the code that was originally validated. In other embodiments, the certification identifier may contain other authorizing information. At a minimum, the certification identifiers used in the preferred embodiments contain enough information to ascertain the key is valid and the code is unchanged.

In yet other embodiments, an originator key may also be included in the certification identifier. This would be especially useful where third party code is pre-validated. For example, a third party may be a supplier of macros to an enterprise. All the macros provided by that third party could be identified with the third party originator key, effectively providing pre-validation for those macros. This would obviate the need for scanning of each macro. This originator key could be published or not, with the nonpublished originator key providing an extra level of security.

Figure 4:
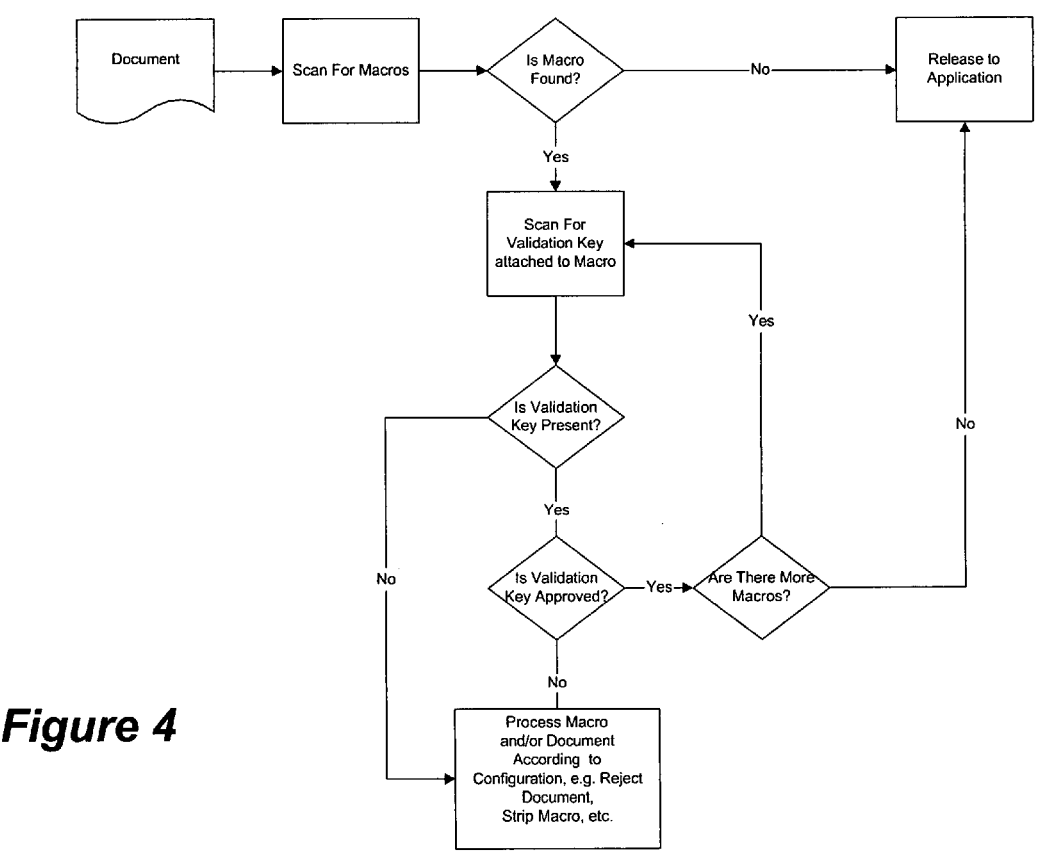
FIG. 4 is a step of the method of the preferred embodiment of FIG. 2.

Turning now to FIG. 4, a method of operation of a workstation component of a preferred embodiment is seen. This method of operation provides the ability to authenticate the code provided to the workstation component. In this example, a Word97 document is provided to the workstation by way of the floppy disk drive. The workstation user clicks on the document to open, however, before the document is opened, the workstation component of this embodiment scans the document for macros. In other embodiments other types of code may be checked.

The workstation component of this embodiment scans the document for macros by using a device driver. The driver is called by, in this example, the operating system's FileOpen command. In this embodiment a driver is used because it is easier to intercept a document at the operating system level. In other embodiments other methods known in the art of interception may be utilized. For example, a dynamic link library file or .DLL file may be used in a Windows 95, 98, NT or 2000 environment.

When the driver is called, the driver intercepts the opening document and scans the document for macros. If a macro is not found, the driver will release the document to the application. If a macro is found, the driver will reference the Master Configuration database, in any manner known in the art, in order to determine if the macro has a certification identifier. If a certification identifier is present for the macro, nothing further will be done with the macro and the driver will proceed to examine the document for the next macro. If no further macros are found, the document will be released to the application. If more macros are found, the process of authentication will occur again. The process is repeated until all macros are validated.

The authentication process is done here by examining for a certification identifier that comprises both a validation key and a hash code. The validation key provides authorization for the specific macro and the hash code provides certainty that the macro is unchanged from that code that was authorized. If there are no certification identifiers for a corresponding macro, the authentication method of the preferred embodiments either permit scanning the code and so generating a certification identifier for the code or de-certifying the code and offering the user a number of options; to delete, to ignore, or to isolate.

The preferred embodiments will have the workstation component use the same certification identifier as was created in the validation component above in order to authenticate the second code. So, for example, if both a validation key and hash code is present in the certification identifier, both the validation key and hash code will be checked in the workstation component. As another example, if a third party nonpublished originator key is used in the certification identifier as well as hash code, those components will be checked by the workstation component. Additionally, in some embodiments, there may be a Forbidden Code database that a certification identifier is checked against, as is described above.

In other embodiments, the workstation component may be implemented within an application. For example, Microsoft Word97 is able to scan and recognize macros within a document. Word97 can also, through use of its API's, call other programs as it opens documents. A preferred embodiment of the present invention may be a workstation component called by Word, after Word scans a document and detects the presence of macros in the document. In this embodiment, the workstation component would undertake authentication via a dynamic link library (.DLL) file called by a Word API. If a certification identifier does exist, the dynamic link library file will allow that macro to operate, log that macro and keep going. The document will then again be scanned for more macros and the process repeats itself.

In some embodiments, dynamic use is possible. For example a document with code that has not previously been authenticated may be intercepted by a workstation component, a copy made of the document and retained by the component, and the original sent to the validation component, and instantly scanned, thus enabling "on the fly" authentication. If the document is validated, the database is updated and notice is sent to the workstation, either directly to the user or to the program that the document can now be opened. If the document is not validated, notice is sent to the user that the document cannot be run and the code is de-certified.

Various configurations are possible for the infected document if the document is de-certified. For example, access to the document could be denied; the offending macro could be wiped from the document; the document and/or macro could be quarantined; the document and/or the macro could be sent to a third party security firm; the document could be re-routed to be opened with WordPad or other program that would not be affected by the macro. In some embodiments, the macro will be stripped entirely from the document in the system and then isolated for security review.

In the preferred embodiments, the workstation component can be configured in a number of different ways. The workstation component configuration can be changed, as well, by authorized individuals, such as the network administrator and/or possibly a local workgroup manager. The workstation user cannot reconfigure his or her workstation component. Across an enterprise, the configurations can vary based upon local security needs. Below an example of a number of configurations are listed.

EXAMPLE

When a Document with Macros is Opened
   AutoMacros, such as AutoOpen, are not allowed to run.
   Macros are checked for validation key.
   If a key is present, the hash code for the macro is compared to the macro to insure the macro is unchanged.
   If the macro has no key, a copy is made of the document, the copy may be optionally retained in a buffer, and the original is sent to the validation component for authentication. Any subsequent dissemination of the document will then be from the original after validation. Otherwise, if the copy is infected and is disseminated, any recipient will be infected as well.
If an Encrypted or Unencrypted Macro does not Match its Hash Code
   A system administrator will be alerted.
   The macro will not be permitted to run.

Of course, other configurations for the workstation are possible. For example, the user's access to macros can be limited in a number of ways: such as prohibiting a user from deleting or editing validated macros; prohibiting all macros from running; etc. A user might be alerted to the presence of a validated or unvalidated macro and any alerts that might be provided could be specific in nature. For example, in an embodiment, a desired alert might be something like "Virus Detected, call Veronica at X1234 for help."

The validation and/or workstation component may log the results. If logging is used by the embodiments, logging may include a variety of events. For example, logging may be configured to include any, all or none of the following events, and may include varying levels of detail:
   Version history
   Virus macro removed
   Probable virus macro removed.
   Unauthorized macro removed
   Authorized macro added
   Registered macro added
   Date installed
   Date last updated
   Date last active
   Date configuration changed Specific configurations could also be used when the network is down by placing a copy of the Master Configuration database or other databases on the local workstation. This would be useful if a database of certification identifiers is inaccessible, for example, if the network over which the embodiment is run is down or inaccessible as when using a laptop computer in the field.

For example, in some embodiments, when a laptop computer is used, the workstation component installed on the laptop would first check for an updated database. If no updated database is present or available, then a local database, previously disseminated, will be used. The same process would be used as is described in the embodiments above in such a situation, with the difference being of course, the use of a database of certification identifiers on the workstation machine. Logging would be desirably used in such an embodiment. A reporting function as well, that is, the use of a report to be sent to the system administrator or other central administrator, would also be desirably used in such an embodiment.

A preferred embodiment additionally may have self-contained macro or code which provides for identification of authenticated code in a document. This self-contained macro or code would permit the authenticated code to run without need for database reference. For example, a document created by the Smith Company may have embedded macros and/or code, as well as a certification identifier from Smith Company. When the Smith Company certification identifier is encountered by the macro or code of the embodiment, the document with embedded macros and/or code will be run without further database referencing. This embodiment would be used in a remote situation. In most embodiments, because of security afforded by central database(s), a Master Configuration database or other central database or databases is preferred.

If a local database would be used, updating the local database could be by any method known in the art. It should be noted that an update component could be sent out regularly from the validation component in such an embodiment.

Secondary security considerations will also be undertaken. For example, the Master Configuration database may be encrypted to insure security. (The database will be flat file in a especially preferred embodiment in order to provide for ease in printing and editing.) Preapproved databases, in whole or part, may be supplied as well in certain embodiments. Use of a preapproved database, in whole or part, will simplify, in some instances, the validation component process. For example, if another entity is providing code, a preapproved database will allow for ease in validation and authorization.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

We claim:

1. A process for identifying code in a document comprising:
   providing code in said document to be certified;
   generating an certification identifier for said code;
   adding said certification identifier to said document;
   adding said certification identifier to a database;
   providing a second code to be authenticated;
   authenticating said second code, wherein authenticating said second code further comprises an action chosen from the group consisting of: referencing a second document containing said second code, referencing said database, and, generating an certification identifier for said code.

2. A process as in claim 1 further comprising:
   de-certifying said second code upon failure to locate a certification identifier, wherein de-certifying said second code further comprises an action chosen from the group consisting of: isolating said second code and, deleting said second code.

3. A process as in claim 1 further comprising:
   executing said second code.

4. A process for identifying code comprising:
   providing a code to be certified;

scanning said code;
generating a first certification identifier for said code;
storing said first certification identifier in a document;
providing a macro to be authenticated; and,
authenticating said macro wherein authenticating said macro further comprises an action chosen from the group consisting of: referencing a second document containing said macro, referencing a database containing said macro, and, generating an certification identifier for said macro.

5. A process as in claim 4 further comprising:
de-certifying said macro upon failure to locate a certification identifier, wherein de-certifying said macro further comprises an action chosen from the group consisting of: isolating said macro and, deleting said macro.

6. A process as in claim 4 further comprising:
executing said macro.

* * * * *